Patented Feb. 7, 1939

2,146,280

UNITED STATES PATENT OFFICE 2,146,280

ALIPHATIC AMINOMETHANE SULPHINIC ACIDS AND THEIR SALTS

Roger Adams, Urbana, Ill., assignor to E. I. du Pont de Nemours & Company, Wilmington, Del., a corporation of Delaware No Drawing. Application December 22, 1937, Serial No. 181,105

8 Claims. (Cl. 260—500)

This invention relates to new compositions of matter and especially to a new class of surface active or capillary active materials which may be advantageously used in processes involving wetting, deterging, dispersing, emulsifying, frothing, foaming, and kindred phenomena. More particularly it relates to aliphatic aminomethane sulphinic acids and their salts. Still more specifically it relates to aliphatic aminomethane sulphinates of the formula

RR'NCH$_2$SO$_2$M in which R is an aliphatic radical of four or more carbon atoms, R' is hydrogen or an aliphatic radical and M is hydrogen, or a salt forming atom or group, e. g., sodium, potassium, ammonium, etc.

This invention has as an object the preparation of a new series of chemical compounds. A further object is to prepare these new chemical compounds by novel and easily conducted processes which give high yields of products of relatively high quality. A still further object is to use these new compounds in various technical processes wherein surface active compounds are commonly employed. Other objects will appear hereinafter.

The aminomethane sulphinates of this invention are best obtained by reacting a salt of formaldehyde sulphoxylic acid with a primary or secondary aliphatic amine having at least one radical of four or more carbon atoms attached to the nitrogen. The following examples will serve to illustrate but not limit the invention. In the following examples the parts are by weight.

EXAMPLE I

Sodium N-dodecyl aminomethane sulphinate

Fifteen parts of sodium formaldehyde sulphoxylate, 18.5 parts of dodecylamine and 150 parts of water were warmed together whereupon all the amine dissolved. The clear solution which foamed readily when shaken was found to be a wetting agent for cotton when tested by the method of Draves and Clarkson (American Dyestuffs Reporter 20, 201 (1931)). This compound also functions as a wetting agent in the mercerizing of cotton goods.

EXAMPLE II

Sodium N-octyl aminomethane sulphinate 113 parts of octylamine, 103 parts of sodium formaldehyde sulphoxylate, and 400 parts of distilled water were mixed together in a flask. At first the amine separated as a layer but after shaking occasionally and standing for one hour the amine went into solution. This compound is a good wetting agent in the mercerizing of cotton goods.

EXAMPLE III

Sodium N-decyl aminomethane sulphinate 123 parts of decylamine, 92.5 parts of sodium formaldehyde sulphoxylate, and 400 parts of distilled water were mixed together in a flask. At first the amine separated as a layer, but after standing for about two hours with occasional shaking the layer disappeared. The reaction mixture was finally heated for a few minutes on the water bath.

EXAMPLE IV

Sodium N-hexadecyl aminomethane sulphinate 142 parts of hexadecylamine, 69.6 parts of sodium formaldehyde sulphoxylate and 1,100 parts of water were heated on the steam bath with occasional shaking. A very small amount of the amine remained undissolved and was filtered from the cold solution.

EXAMPLE V

Sodium N-octadecenyl aminomethane sulphinate 28.5 parts of octadecenylamine, 12.6 parts of sodium formaldehyde sulphoxylate, and 500 parts of water were heated to 40–45° C. and shaken occasionally. The oil disappeared after about 6 hours. The product was a milky solution.

EXAMPLE VI

Sodium N-isobutyl aminomethane sulphinate 29.5 parts of sodium formaldehyde sulphoxylate was dissolved in 100 parts of water and 18.3 parts of isobutylamine added to the solution. A clear colorless solution resulted.

EXAMPLE VII

Sodium N-2-ethylhexyl aminomethane sulphinate 25.8 parts of 2-ethylhexylamine, 23.6 parts of sodium formaldehyde sulphoxylate, 75.6 parts of water were stirred together in a flask provided with a reflux condenser four hours at 25–30° C. The resulting clear solution was found to be an assistant in the mercerizing of cotton.

Example VIII

*Sodium N-methyl, N-heptyl aminomethane sulphinate*

25.8 parts of N-methyl N-heptylamine, 23.6 parts of sodium formaldehyde sulphoxylate, and 75.6 parts of water were stirred together two hours at room temperature. The resulting clear liquid was found to be a very efficient mercerizing assistant and wetting agent during the mercerizing of cotton goods.

Example IX

*Sodium dibutyl aminomethane sulphinate*

12.9 parts of dibutylamine, 11.8 parts of sodium formaldehyde sulphoxylate and 75.3 parts of water were stirred together 48 hours at room temperature. At the end of this time a small oil layer remained undissolved which was separated off. The clear aqueous solution foams slightly when shaken.

While the reaction is generally carried out in water as a solvent, I may employ other solvents such as dioxan or alcohols of which methanol is a suitable example. In general the amines react quite readily with sodium formaldehyde sulphoxylate at normal temperatures but in certain cases the rate of reaction may be increased by raising the temperature. Temperatures up to 100° C. have been successfully employed.

Other primary or secondary amines which may be used include n-butylamine; N-methyl isobutylamine; N-isopropyl octylamine; N-methyl-2-ethylhexylamine; N-methyl hexadecylamine; N-ethyl tetradecylamine; undecenylamine; ricinoleylamine; eleostearylamine, etc. The aliphatic radicals of the amines employed may be the radicals of the mixture of alcohols obtainable by the catalytic hydrogenation or sodium reduction of natural fats and oils, such as, coconut oil, cottonseed oil, castor oil, China-wood oil, lard oil, beef tallow, etc. The aliphatic radicals of the amines may also be the radicals of the higher alcohols obtained in the catalytic synthesis of methanol from carbon monoxide and hydrogen. In general, I prefer to use open chain aliphatic amines, that is, amines in which the carbon attached to the amino nitrogen is an open chain or aliphatic carbon.

Since the products are in general useful as surface active agents, I prefer to start with an amine which has an open chain aliphatic radical of at least four and preferably six carbon atoms directly attached to the nitrogen. For the preparation of detergents, I prefer to start with dodecyl amine, 9, 10-octadecenylamine, or the mixture of amines obtainable by hydrogenation of the mixture of nitriles prepared from coconut oil acids, or the mixture of unsaturated amines obtainable by hydrogenation of the mixture of nitriles prepared from sperm oil acids. For the preparation of mercerizing assistants, I prefer to start with amines which have less than 12 carbon atoms, as for example, N-methyl heptylamine or n-octylamine.

While I have for the most part prepared the sodium salts of these novel aliphatic aminomethane sulphinic acids because sodium formaldehyde sulphoxylate is available as a dyestuff reducing agent I do not wish to restrict myself thereto. This invention includes other salts and also the free acids.

It is to be understood that when I refer to aliphatic aminomethane sulphinates I mean to include the free acids, and their salts such as sodium, potassium, ammonium, calcium, magnesium, zinc, aniline, cyclohexylamine, ethylamine, isobutylamine, dimethylamine, glucamine, dodecylamine, triethanolamine, pyridine, monoethanolamine, as well as salts of quaternary ammonium bases.

The new compositions covered in this case belong to the class of surface active or capillary active materials in that they have colloidal properties and may therefore be advantageously used in any process involving wetting, penetrating, deterging, dispersing, emulsifying, frothing, foaming, and kindred phenomena. These compositions may be employed in pure or standardized form, and if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials. They may for example be added to flax retting baths or may be employed as assistants in fulling and felting processes. They may be used in sizing preparations in combination with the usual materials such as starches, gelatine, clays, weighting salts, etc. The penetrating power of these new compositions is utilized with advantage when they are added to baths containing starch ferments which are employed for removing sizing from textile materials. These products function as useful wetting, cleansing, and penetrating agents in bleaching liquors such as those used in the kier boiling of cotton goods. They are particularly useful when added to the lye liquors employed for mercerizing cotton goods. They improve the absorption capability of fibrous materials when such materials are subjected to treatments for finishing, softening, stiffening, coloring, impregnating, water-proofing, and mildew proofing. They may be used in the preparation of dyestuffs in readily dispersible form and as penetrants and wetting agents they assist in producing level dyeings in neutral, acid, or alkaline dyeing baths. In printing pastes, they assist in the dispersion of the dye or dye component and facilitate its penetration into the natural or synthetic fibers.

In the leather industry these compositions function as useful wetting agents in soaking, deliming, bating, tanning, and dyeing baths, and in baths used for fat-liquoring leather. The dispersing and emulsifying powers of these new compositions may be utilized for converting liquid or solid substances normally insoluble in water, such as hydrocarbons, waxes, higher alcohols, pitches, and pitchy substances into clear solutions or stable emulsions or dispersions. They may be used to prepare artificial dispersions of crude, vulcanized or reclaimed rubber. They may be used in the emulsion polymerization of polymerizable compounds such as chloroprene, which are capable of yielding rubber-like materials such as neoprene.

These compositions may be employed as detergents in several different relations. They may be used in the washing of fruits and vegetables for spray residue removal. They may be used in combination with metal cleaning compounds in neutral, acid or alkaline liquors. They may be used for paint, varnish, and lacquer cleaners. They may advantageously be employed as cleansing agents in hard water and where a fatty or oily film resists the ordinary cleansing media.

These compositions also have several miscellaneous uses. They may be employed as foam stabilizing agents, especially for use in air-foam fire extinguishing compositions. They may be used to stabilize rubber latex. They may also be used as frothing and collecting agents in ore flotation processes and may be used to break petroleum emulsions of the water-in-oil type.

The above description and examples are intended to be illustrative only and not to limit the scope of the invention. Any departure therefrom which conforms to the spirit of the invention is intended to be included within the scope of the appended claims.

I claim:

1. Aliphatic aminomethane sulphinates of the formula $RR'NCH_2SO_2M$ in which R is an aliphatic radical of four or more carbon atoms, R' represents a member of the group consisting of hydrogen and lower alkyl radicals, and M stands for a member of the group consisting of hydrogen and a salt forming group from the group consisting of ammonium, alkali metals, alkaline earth metals, zinc, saturated aliphatic amines, aniline, and pyridine.

2. Aliphatic aminomethane sulphinates of the formula $RR'NCH_2SO_2M$ in which R is an alkyl radical of six to eighteen carbon atoms, R' represents a member of the group consisting of hydrogen and lower alkyl radicals, and M stands for a member of the group consisting of hydrogen and a salt forming group from the group consisting of ammonium, alkali metals, alkaline earth metals, zinc, saturated aliphatic amines, aniline, and pyridine.

3. Aliphatic aminomethane sulphinates of the formula $RNHCH_2SO_2M$ in which R is an alkyl radical of six to eighteen carbon atoms and M stands for an alkali metal.

4. Aliphatic aminomethane sulphinates of the formula $RNHCH_2SO_2Na$ in which R is an alkyl radical of eight or more carbon atoms.

5. Aliphatic aminomethane sulphinates of the formula $RNHCH_2SO_2Na$ in which R stands for a straight chain aliphatic hydrocarbon group containing from eight to eighteen carbon atoms.

6. Sodium N-octadecenyl aminomethane sulphinate.

7. Sodium N-2-ethylhexyl aminomethane sulphinate.

8. Sodium N-methyl, N-heptyl aminomethane sulphinate.

ROGER ADAMS.